United States Patent
Wu et al.

(10) Patent No.: US 11,907,072 B2
(45) Date of Patent: Feb. 20, 2024

(54) CONTROLLER, COMPUTING DEVICE, BIOS RECOVERY AND BACKUP METHOD AND SECURITY PROFILE SETTING METHOD

(71) Applicant: NUVOTON TECHNOLOGY CORPORATION, Hsinchu (TW)

(72) Inventors: Fong-Jhu Wu, Hsinchu (TW); Shih-Hsuan Yen, Hsinchu (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 17/972,638

(22) Filed: Oct. 25, 2022

(65) Prior Publication Data
US 2023/0176950 A1   Jun. 8, 2023

(30) Foreign Application Priority Data
Dec. 3, 2021   (TW) .................. 110145129

(51) Int. Cl.
*G06F 11/14*   (2006.01)
*G06F 9/4401*   (2018.01)

(52) U.S. Cl.
CPC ........ *G06F 11/1417* (2013.01); *G06F 9/4403* (2013.01); *G06F 11/1469* (2013.01)

(58) Field of Classification Search
CPC .... G06F 11/14; G06F 11/1417; G06F 9/4403; G06F 11/1469
See application file for complete search history.

(56) References Cited

U.S. PATENT DOCUMENTS

| | | | |
|---|---|---|---|
| 7,669,232 B2* | 2/2010 | Jou | H04L 63/08 380/247 |
| 10,067,834 B1* | 9/2018 | Montero | G06F 11/1417 |
| 11,151,256 B2* | 10/2021 | Martinez | G06F 21/55 |
| 2009/0271660 A1* | 10/2009 | Chin | G06F 11/0757 714/15 |
| 2011/0093741 A1* | 4/2011 | Liang | G06F 11/1417 713/300 |
| 2020/0073568 A1* | 3/2020 | Chaiken | G11C 29/021 |

* cited by examiner

*Primary Examiner* — Kamini B Patel
(74) *Attorney, Agent, or Firm* — Muncy, Geissler, Olds & Lowe, P.C.

(57) ABSTRACT

A controller used in a computing device executes the following steps. When a security profile stored in a storage device is successfully verified, according to a security profile configuration stored in the controller, an operation mode described in the security profile is used. When the used operation mode is in a non-secure mode, the booting of the computer device is directly completed. When the used operation mode is a secure mode and a main BIOS of the computing device is not valid, at least one BIOS stored in the storage device is used to recover the main BIOS, and the computer device is rebooted. When the used operation mode is a secure mode and the main BIOS is valid, but the storage device does not store the main BIOS, the main BIOS is backed up and to be stored in the storage device.

16 Claims, 7 Drawing Sheets

CONTROLLER, COMPUTING DEVICE, BIOS RECOVERY AND BACKUP METHOD AND SECURITY PROFILE SETTING METHOD

CROSS-REFERENCE TO RELATED APPLICATION

This application claims the priority benefit of TW application serial no. 110145129, filed on Dec. 3, 2021, the full disclosure of which is incorporated herein by reference.

BACKGROUND

Technical Field

The present disclosure relates to the BIOS recovery and backup technology, and more particularly to a controller, a computer device, a BIOS recovery and backup method and a security profile setting method, which are implemented by using an operation mode described in a security profile of an external storage device.

Description of Related Art

In recent years, the market of computing devices (personal computers or notebooks for example) is mainly on the dual BIOS recovery and backup technology, and the technology of the BIOS platform firmware resiliency (PFR) has also gradually become a demand in the market of personal computers or notebooks. The benefit of the dual BIOS is the higher security level. However, it is necessary to adopt two non-volatile memories (NVMs) when using dual BIOS to implement the system of PFR (for instance, two serial peripheral interface (SPI) flash memory with the capacity of 32 Mbyte), so the higher manufacturing cost cannot be avoided. Furthermore, the application of the dual BIOS recovery and backup is usually the only fixed mode, so the user can not choose the processing mode what they want, i.e. the application is not flexible. Also, the computing device cannot normally boot when abnormal recovery occurs, and the user cannot know what is happened.

Additionally, except for the dual BIOS, some computing devices in the market adopt single BIOS, which only need a single SPI flash memory, so the manufacturing cost is reduced. One of the computing devices with the single BIOS is updated via the BIOS interface. When the computing device boots and enters the BIOS menu, the BIOS recovery and backup can be executed via the storage device which is connected to one of the USB ports and other type ports by the user without installing any software additionally. However, the disadvantage of this method is that the computing device cannot boot as normal and the user cannot operate when the single flash memory is abnormal.

Another type of the computing device with the single BIOS is designed to execute the BIOS recovery and backup via a special button and connecting the storage device to the designated USB port or the other type port. The characteristic of this method is that it can execute the BIOS recovery and backup only when the motherboard of the computing device can supply power without booting the computing device. However, the disadvantage of this method is that the BIOS recovery and backup can be executed only when the user operates manually and the storage device must be connected to the designated port.

SUMMARY

One of the purposes of the present disclosure is to provide a controller used for a computing device, configured to control a switcher to allow a platform controller hub to access a storage device via the switcher, and the controller comprises a storage unit, an input/output interface and a processing unit. The storage unit is configured to store a firmware, a first security key and a piece of security profile configuration. The input/output interface is electrically connected to the switcher. The processing unit is configured to read the firmware when the computing device boots, so as to execute steps as follows:

using the first security key to verify a security profile stored in the storage device when the storage device is connected to an input/output interface;

using an operation mode profiled by the security profile according to the security profile configuration when successfully verifying the security profile stored in the storage device;

completing the booting of the computing device when the operation mode is a non-secure mode;

using at least one basic input/output system (BIOS) stored in the storage device to recover a main BIOS and rebooting the computing device when the operation mode is a high-secure mode or a multiple-backup mode and the main BIOS in the computing device is invalid; and backing up and storing the main BIOS to the storage device when the operation mode is the high-secure mode or the multiple-backup mode and the main BIOS is valid but does not be stored in the storage device.

Correspondingly, an embodiment of the present disclosure provides a BIOS recovery and backup method executed by the above controller, a computing device using the above controller, and a security profile setting method corresponding to the above BIOS recovery and backup method.

In summary, the technical manner provided in an embodiment of the present disclosure is suitable to a computing device which has a single BIOS and a single non-volatile memory, so as to reduce the cost of the non-volatile memory. Also, the technical manner has technical effects as follows, it increases the flexibility, achieves the function of the main BIOS recovery and backup, determines the security level according to the user's requirement, and saves power.

In order to further understand the technology, means, and effects of the present disclosure, reference may be made by the detailed description and drawing as follows. Accordingly, the purposes, features and concepts of the present disclosure can be thoroughly and concretely understood. However, the following detailed description and drawings are only used to reference and illustrate the implementation of the present disclosure, and they are not used to limit the present disclosure.

BRIEF DESCRIPTION OF THE DRAWINGS

The accompanying drawings are provided to enable person having ordinary skill in the art can further understand the present disclosure, and the accompanying drawings are incorporated in and constitute a part of the specification of the present disclosure. The drawings illustrate exemplary embodiments of the present disclosure, and the description in the specification of the present disclosure is served to explain together the principal of the present disclosure.

DETAILED DESCRIPTION

Figure 1:
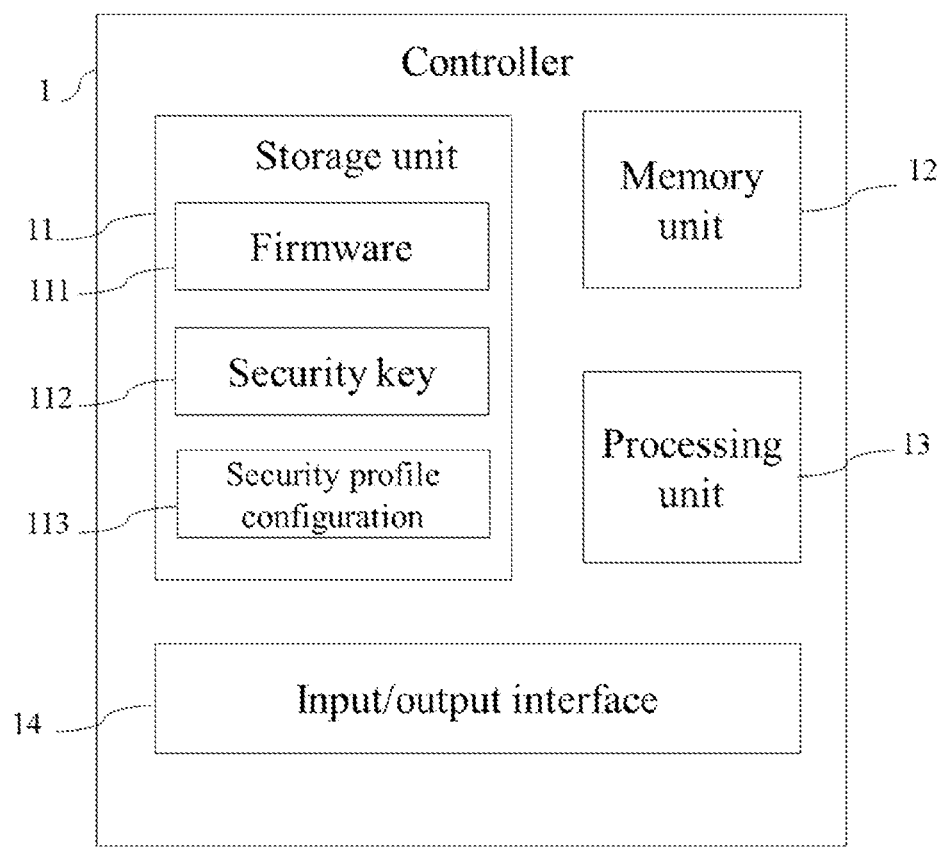
FIG. 1 is a schematic block diagram of a controller according to an embodiment of the present disclosure.

Reference will now be made in detail to exemplary embodiments of the present disclosure, exemplary embodiments of which are illustrated in the accompanying drawings. Wherever possible, the same element number is used in the drawings and the description to refer to the same or the similar part. Furthermore, exemplary embodiments are only one of implemental ways in the concept of design of the present disclosure, none of exemplars described below is intended to limit the present disclosure.

In present, the penetration rate of the USB flash memory device is high, and the storage space of most USB flash memory devices is over 32 Mbyte, so the USB flash memory device can be used to replace the flash memory for backing up (for example, a SPI flash memory, but the present disclosure is not limited thereto). In an embodiment of the disclosure, a controller, a computing device, a BIOS recovery and backup method, and a security profile setting method that use an operation mode described in the security profile of an external storage device to implement the BIOS recovery and backup are provided. The technical manner above allows the user to determine to turn on the BIOS PFR by himself or herself or both (it is realized via defining the operation mode as a non-secure mode or a secure mode), so as to not only increase flexibility, but also to achieve the security level of the dual BIOS without installing two non-volatile memories in the computing device. That is, the computing device can adopt only a single non-volatile memory (for example, a SPI flash memory, but the present disclosure is not limited thereto).

The present disclosure provides a technical solution, which can execute the BIOS recovery and backup when the user connects the storage device with the initialized and set security profile to the port (e.g. USB port, but the types of the port are not used to limit the present disclosure) of the computing device having merely one non-volatile memory, so as to achieve the application of the BIOS protection. Additionally, although the above content illustrates that the technical manner of the present disclosure can be used in a computing device that only adopts a single non-volatile memory to store the main BIOS, the present disclosure is not limited thereto. The technical manner above can also be used in a computing device that adopts two non-volatile memories to store the main BIOS (i.e. the computing device with the dual BIOS).

In the present disclosure, the user can determine how to set up the security profile (the security profile can be verified via a security key stored at a controller) to describe the operation mode of the security profile that includes at least one of one non-secure mode and multiple secure modes (p.s. there are two types of secure modes, defined as high-secure mode and multiple-backup mode respectively). Thus, comparing to prior arts, the technical manner in the present disclosure increase usage flexibility to the user. In addition, the technical manner above can be used in a computing device with single BIOS, and the computing device can execute the BIOS recovery and backup via the external storage device and the technical application of PFR. Therefore, comparing to the computing device with the dual BIOS, the technical manner in the present disclosure can reduce the cost of the non-volatile memory used to store BIOS in the situation of considering the security.

Furthermore, when the controller cannot verify the security profile successfully (e.g. the security profile may be forged or damaged), and the controller does not store the key lock security profile, or, when the controller verifies the security profile successfully and detects the operation mode used is the non-secure mode, the controller will operate in the non-secure mode. After completing the booting in the non-secure mode, the switcher can be controlled to allow the platform controller hub (PCH) to access the storage device (i.e. the port of the computing device connected to the storage device can be used by the PCH, so that the user can access the storage device via the computing device). The above operation mode can be provided to the user who does not need the application of the BIOS protection. Moreover, when the controller stores the key lock security profile, the controller will interrupt the booting of the computing device if the controller cannot verify the security profile successfully, so as to implement the purpose that the storage device should be as a necessary key for safe booting.

As soon as the controller verifies the security profile successfully and detects the operation mode is the multiple-backup mode, the controller will inspect or check the version of the main BIOS and all versions of the BIOS of the storage device if the main BIOS is valid (i.e. the main BIOS passes the verification), so as to discriminate whether there is a version of the main BIOS in all versions of the BIOS in the storage device. If there is the version of the main BIOS in all versions of the BIOS in the storage device, the computing device will be allowed to complete the booting, and the controller will control the switcher to prohibit PCH to access the storage device via the switcher. If there is no version of the main BIOS in all versions of the BIOS in the storage device, the automatic backup will be executed and the main BIOS will be stored into the storage device. If the BIOS is invalid (i.e. the main BIOS does not pass the verification), the controller will allow the user to choose one of multiple BIOS from the storage device to execute the recovery of the main BIOS.

When the controller verifies the security profile successfully and detects the operation mode is the high-secure mode, the controller will inspect or check the version of the main BIOS and all versions of the BIOS in the storage device during the booting if the main BIOS is valid (i.e. the main BIOS passes the verification). If the main BIOS has been stored in the storage device i.e. the main BIOS is one of the all BIOS in the storage device, and the main BIOS is the latest version, the computing device will be allowed to complete the booting. If the main BIOS is not stored in the storage device, but the main BIOS is the latest version, the main BIOS will be backed up to the storage device and the computing device will be allowed to complete the booting. If the main BIOS is not the latest version, and one of all BIOS in the storage device is the latest version, the main BIOS will be recovered and replaced by the latest BIOS, and whether to back up the main BIOS to the storage device additionally or not will be determined according to whether the main BIOS is stored in the storage device. When the operation mode is the high-secure mode, and the booting of the computing device is completed, the controller will control the switcher to prohibit PCH to access the storage device via the switcher. If the BIOS is invalid (i.e. the main BIOS does not pass the verification), the controller will allow the user to choose the latest version of multiple BIOS from the storage device to execute the recovery of the main BIOS.

Additionally, when the computing device boots abnormally or executes the backup of the main BIOS, the controller will generate a system debug log of corresponding event accordingly, and will store the system debug log of corresponding event to the storage device, so that the user can disconnect the storage device from a computing device and connect it to another computing device. Then, the other computing device can access the system debug log to execute a simple detection and solve the abnormality accordingly.

On the other hand, after completing the booting of the computing device, the controller can further determine whether there is a read/write lock stored in the storage device. If there is the read/write lock stored in the storage device, the computing device will stop supplying power to the storage device (usually, turning off the port used to connect to the computing device). If there is no read/write lock stored in the storage device, whether the power is stopped supplying to the storage device or the switcher is controlled to allow PCH to access the storage device will be determined according to the operation mode used (as described above, the PCH can access the storage device when the operation mode is the non-secure mode, and when the operation mode is the high-secure mode or the multiple-backup mode, the PCH cannot access the storage device after completing the booting of the computing device).

Therefore, the manner that the power is controlled to be supplied to the storage device according to whether the read/write lock is stored in the storage device or not can achieve the purpose of saving electricity according to the need, and can also meet the security need of the user. For the user with the high security need, the user can choose to turn off the port of the computing device used for connecting to the storage device, so as to achieve the data protection of the BIOS stored in the storage device. For the user looking for convenience, the user can choose to keep the port of the computing device used for connecting to the storage device as normal, so that the user can access the storage device via the computing device as normal. In short, the user can determine by himself or herself whether he or she wants security or more convenient user experience.

According to an embodiment in the present disclosure, the security profile which is necessary to be stored in the storage device and the security key used for signature verification (usually a public key) can be implemented via the specific application program installed in the computing device (i.e. designing a security profile setting method used for the BIOS recovery and backup method executed in the computing device). The user can operate the specific application program to input a user command to generate the security profile based on the security key (usually a private key), and to store the security profile and the security key (usually a public key generated from the private key) to the storage device. The operation mode of the security profile can be set by the user, and operation mode can be a non-secure mode, a high-secure mode or a multiple-backup mode. The user can further input the user command to generate the read/write lock and store the read/write lock into the storage device.

Additionally, if it is necessary to use the storage device as a necessary key used for safe boot, the user can further input the user command to generate a key lock security profile and store the key lock security profile into a storage unit of the controller. Moreover, the user can input the user command via the specific application program to inspect and read the system debug log stored in the storage device described above, and the user can even input the user command via the specific application program to choose at least one BIOS to store in the storage device. Furthermore, the user can input the user command via the specific application program to make the security profile record a specific password, so that the user must enter the corresponding specific password to enable the computing device to execute the booting process during booting. Preferably, the specific password is stored in the storage device after the specific password is encrypted by the private key, so that the user must enter the corresponding specific password and the signature verification should be executed (i.e. the public key is used to decrypted the encrypted specific password in the storage device, and the decrypted specific password is compared with the input specific password).

Moreover, during the booting of the computing device, the controller verifies the signature of the security profile stored in the storage device, so as to discriminate whether the security profile stored in the storage device is valid or not. If the verification is successful, the controller will further use the operation mode described in the security profile of the storage device according to the security profile configuration of the controller. Furthermore, if there is only one operation mode, the controller directly operates in the above operation mode. If there are multiple operation modes, users can choose one of the operation modes by operating the keyboard. On the other side, the controller also verifies the signature of the BIOS stored in the storage device via the public key corresponding to the main BIOS. When the signature of the security profile and the signature of the BIOS stored in the storage device are all valid, the recovery of the main BIOS is allowed to be executed.

The technical manner in the present disclosure can be used for the computing device with a single BIOS (which only has a single non-volatile memory used to store BIOS), under this framework, the user can determine the level of the secure protection. The user only needs to initialize the storage device and make the valid security profile. Then, after the user inserts the storage device to the port of the computing device, the application of the BIOS recovery and backup can be executed. Every time the computing device boots, the controller of the computing device inspects or checks whether the security profile in the storage device and the main BIOS in the non-volatile memory are valid, and it is not necessary to additionally add a button for the user to press the button to execute the BIOS recovery and backup. Especially, if the computing device cannot boot due to the damage of the main BIOS in the non-volatile memory, the technical manner in the present disclosure allows the user to make the valid security profile and BIOS by operating another computing device and store them in the storage device. Then, the user inserts the storage device to the computing device which cannot boot and press the booting button of the computing device, the BIOS recovery can be executed immediately and the main BIOS can be protected.

Figure 2:
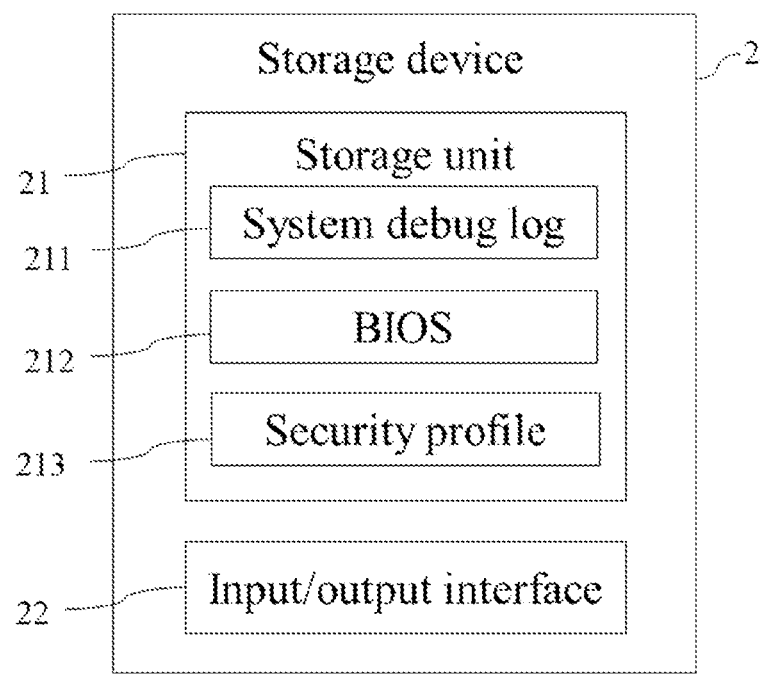
FIG. 2 is a schematic block diagram of a storage device according to an embodiment of the present disclosure.
Figure 3:
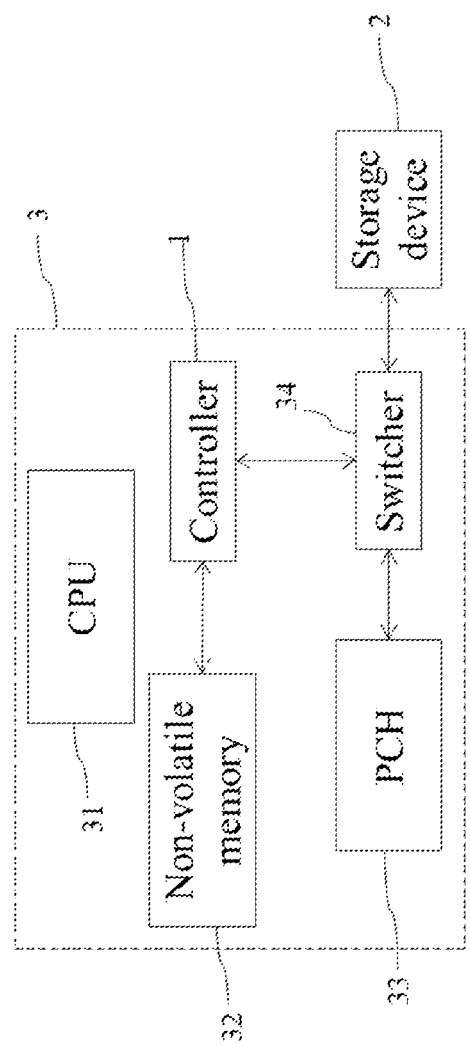
FIG. 3 is a schematic block diagram of a computing device according to an embodiment of the present disclosure.

Afterwards, refer to FIG. 1, FIG. 2, and FIG. 3. FIG. 1 is a schematic block diagram of a controller according to an embodiment of the present disclosure, FIG. 2 is a schematic block diagram of a storage device according to an embodiment of the present disclosure, and FIG. 3 is a schematic block diagram of a computing device according to an embodiment of the present disclosure. The controller 1 according to the embodiment in the present disclosure is used in a computing device 3, the controller 1 comprises a storage unit 11, a memory unit 12, a processing unit 13 and an input/output interface 14. In an embodiment of the present disclosure, the controller 1 is an embedded controller disposed on a motherboard of the computing device 3, or an embedded input/output controller disposed on the motherboard, and the present disclosure is not limited thereto.

The storage unit 11 is configured to storage a firmware 111, at least one security key 112 (e.g. a public key for the security verification) and a security profile configuration 113. The memory unit 12 is configured to temporarily store temporary data of each step executed by the processing unit 13. The processing unit 13 is configured to read the firmware 111 and execute the steps of the BIOS recovery and backup method of the present disclosure. The input/output interface 14 is electrically connected to a switcher 34 of the computing device 3, wherein the switcher 34 is controlled by the controller 1 to allow a platform controller hub 33 of the computing device 3 to access a storage device 2 via the switcher 34. It is noted that, the number of the security keys 112 can be two, one of the security keys 112 is configured to verify the security profile, and other one of the security keys 112 is configured to verify the main BIOS and the BIOS stored in a storage device 2.

The storage device 2 comprises a storage unit 21 and an input/output interface 22, wherein the storage unit 21 stores a system debug log 211, at least one backed up BIOS 211, and a security profile 213 (which comprises data itself and a signature used for the verification). The storage device 2 for example is a USB flash memory device, and the present disclosure is not limited thereto. The computing device 3 comprises the controller 1, a central processing unit 31, a non-volatile memory 32 (used to storage the main BIOS), the platform controller hub 33 and the switcher 34, wherein the controller 1 can be electrically connected to the non-volatile memory 32 and the switcher 34, and the platform controller hub 33 can be electrically connected to the switcher 34. The storage device 2 can be electrically connected to the controller 1 via the input/output interface 22 and the switcher 34 of the computing device 3 by plugging the storage device 2 into the port (e.g. a USB port) of the computing device 3.

Figure 4:
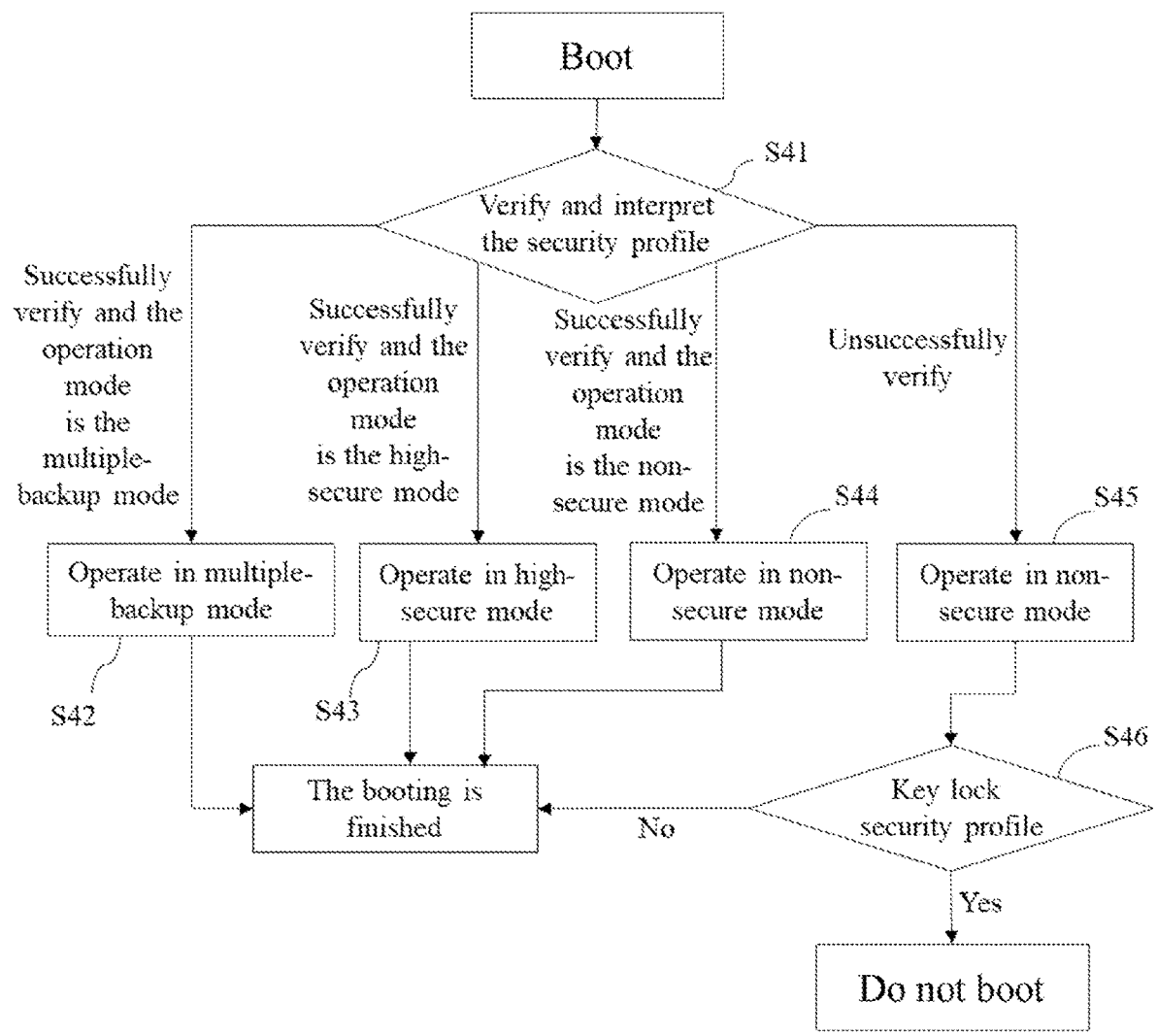
FIG. 4 is a flowchart of a BIOS recovery and backup method during a booting process according to an embodiment of the present disclosure.

Refer to FIG. 1 to FIG. 4 simultaneously, and FIG. 4 is a flowchart of a BIOS recovery and backup method during a booting process according to an embodiment of the present disclosure, and steps S41-S46 are executed by the processing unit 13 of the controller 1. During the booting of the computing device 3, if the storage device 2 is signally connected to the input/output interface 14 of the controller 1 (i.e. the storage device 2 is inserted to the port of the computing device 3), in step S41, the controller 1 will use one of the security keys 112 to verify the security profile 213, and interpret an operation mode described in the security profile 213 that the user wants to use based on the security profile configuration 113.

If the controller 1 successfully verifies the security profile 213 stored in the storage device 2, and the operation mode is the multiple-backup mode, step S42 will be executed. In step S42, the controller 1 controls the computing device 3 to operate in the multiple-backup mode, and the controller 1 uses the other one stored security key 112 to verify the main BIOS and at least one BIOS 212 stored in the storage device 2. If the verification of the main BIOS fails, the user can choose the successfully verified BIOS 212 to recover the main BIOS (p.s. if there is only a BIOS 212, it can be designed to recover the main BIOS by using the only one BIOS 212 without allowing users to choose), and then the computing device 3 reboots. After the computing device 3 reboots, the booting of the computing device 3 is finished. If the verification of the main BIOS is successful, but the main BIOS has not been stored in the storage device 2, the main BIOS will be stored in the storage device 2, and then, the computing device 3 completes the booting. The computing device 3 operated in the multiple-backup mode does not allow the user to access the storage device 2. Thus, the controller 1 controls the switcher 34 to prohibit the platform controller hub 33 to access the storage device 2 via the switcher 34.

If the controller 1 successfully verifies the security profile 213 stored in the storage device 2, and the operation mode is the high-secure mode, step S43 will be executed. In step 43, the controller 1 controls the computing device 3 to operate in the high-secure mode, and the controller 1 uses the other one stored security key 112 to verify the main BIOS and at least one BIOS 212 stored in the storage device 2. If the verification of the main BIOS is failed, the latest version of the verified BIOS 212 is used to recover the main BIOS, and then the computing device 3 reboots. After the computing device 3 reboots, the booting is finished. If the verification of the main BIOS is successful and the main BIOS is the latest version, whether the backup main BIOS is stored to the storage device 2 or not will be determined according to whether the storage device 2 stores the main BIOS, and then the computing device will complete the booting. If the verification of the main BIOS is successful but the main BIOS is not the latest version, the latest version of the verified BIOS 212 will be used to recover the main BIOS and then the computing device 3 will reboot, so as to complete the booting. If the main BIOS is not stored in the storage device 2, the controller 1 will further store the backup main BIOS to the storage device 2. The computing device 3 operated in the high-secure mode does not allow the user to access the storage device 2. Thus, the controller 1 controls the switcher 34 to prohibit the platform controller hub 33 to access the storage device 2 via the switcher 34.

If the controller 1 successfully verifies the security profile 213 stored in the storage device 2, and the operation mode is the non-secure mode, step S44 will be executed. In step 44, the controller 1 allows the computing device to operate in the non-secure mode, so as to complete the booting of computing device 3. After the booting is finished, the controller 1 controls the switcher 34 to allow the platform controller hub 33 to access the storage device 2 via the switcher 34. However, if the storage device 2 stores the read/write lock, the controller 1 will control the computing device 3 to stop supplying power to the storage device 2 to stop the access of the storage device 2, so as to achieve the purpose of saving electricity and improving the security.

If the controller 1 unsuccessfully verifies the security profile, step S45 will be executed. In step S45, the controller 1 allows the computing device 3 to operate in the non-secure mode, and then, the step S46 is executed. In step S46, the controller 1 further discriminates whether the storage unit 11 stores a key lock security profile. If the storage unit 11 stores the key lock security profile, the booting of the computing device 3 will be interrupted, or on the contrary, the booting of the computing device 3 will be finished. After the booting is finished, the controller 1 controls the switcher 34 to allow the platform controller hub 33 to access the storage device 2 via the switcher 34. However, If the storage device 2 stores the read/write lock, the controller 1 will control the computing device to stop supplying power to the storage device 2 to prohibit the access of the storage device 2, so as to achieve the purpose of saving electricity and improving the security.

Figure 5:
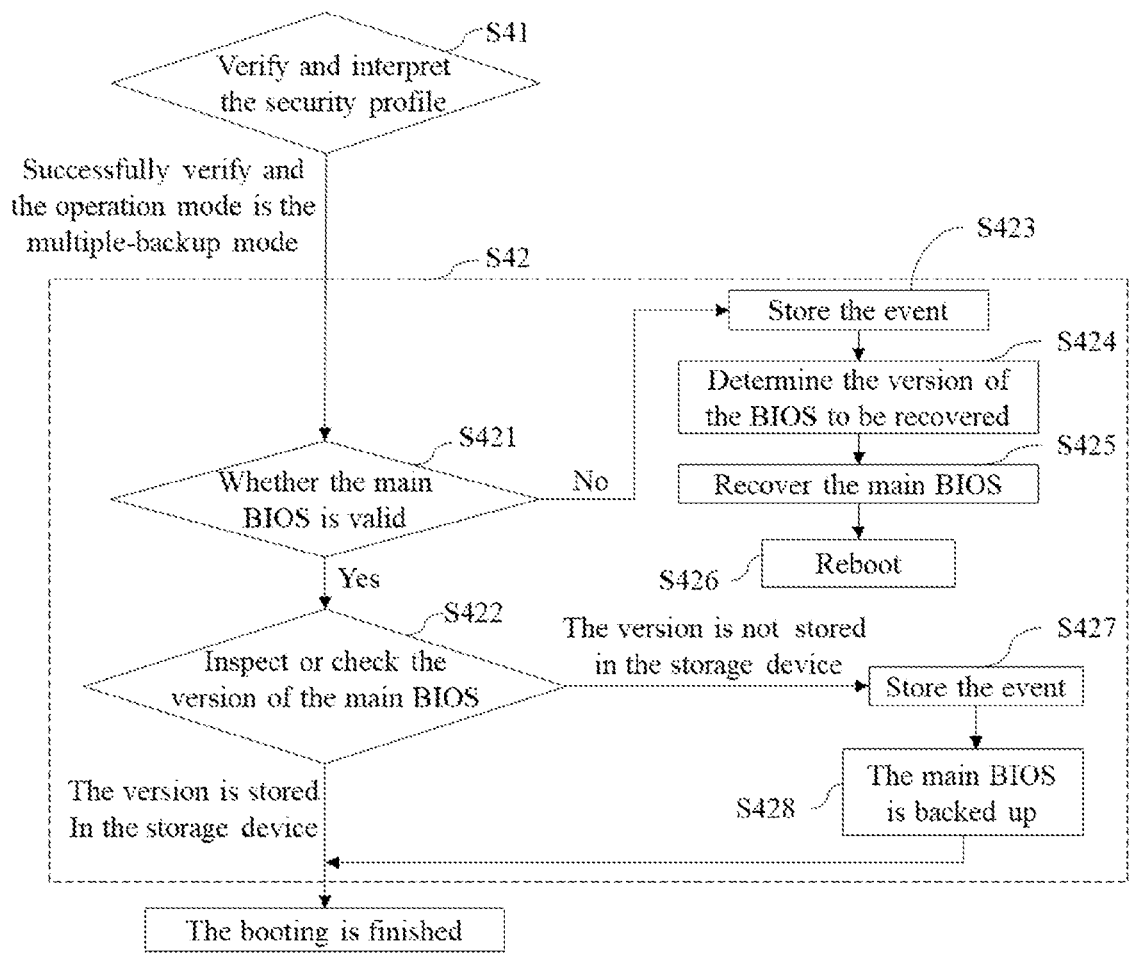
FIG. 5 is a flowchart of a BIOS recovery and backup method that is operated in a multiple-backup mode according to an embodiment of the present disclosure.

Consecutively, please refer to FIG. 1 to FIG. 5 simultaneously, and FIG. 5 is a flowchart of a BIOS recovery and backup method that is operated in a multiple-backup mode according to an embodiment of the present disclosure. The step S42 comprises steps S421-S428. After the security profile is verified successfully and the used operation mode is interpreted to be the multiple-backup mode, in step S421, the controller 1 uses the other one security key 112 to verify the main BIOS and BIOS 212. If the verification of the main BIOS is successful (i.e. the main BIOS is valid), step S422 is executed; otherwise, step S423 is executed. In step S422, the controller 1 further inspects or checks the version of the main BIOS to discriminate whether the main BIOS has been stored in the storage device 2. For instance, comparing the version of the main BIOS and the version of the BIOS 212. If the BIOS 212 of the storage device has had the main BIOS, the booting will be finished; otherwise, step S428 will be executed.

If the main BIOS is invalid and cannot be verified successfully. For example, the main BIOS is damaged or tampered, in step S423, the controller 1 previously records the incorrect event of the main BIOS to the system debug log 211 stored in the storage device 2. Then, in step S424, the user chooses one of at least one of the BIOS 212 to execute the recovery of the main BIOS. After, in step S426, the computing device 3 reboots.

If the main BIOS is not stored in the storage device 2, in order to avoid that there is no backup file to recover the main BIOS while the main BIOS may be damaged in the future, in step S428, the main BIOS will be backed up, i.e. storing the main BIOS to the storage device 2, so that at least one of the BIOS 212 can comprise the main BIOS. Additionally, before step S428 is executed, step S428 is executed first, so as to record the event that the main BIOS is not stored in the storage device 2 in the system debug log 211 stored in the storage device 2. It is noted that, step S423 and step S427 are not necessary steps in other embodiments.

Figure 6:
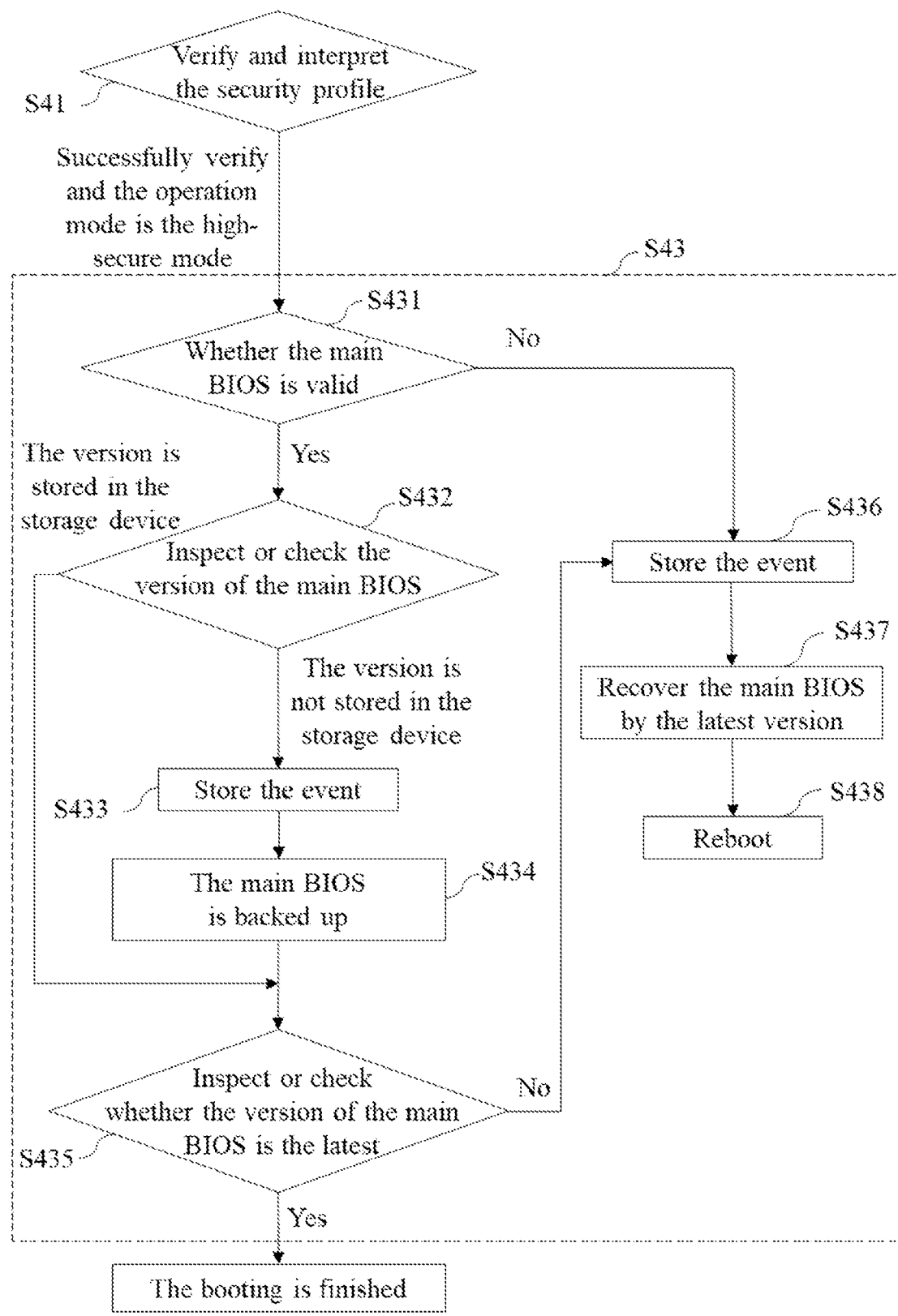
FIG. 6 is a flowchart of a BIOS recovery and backup method when operating in a high-secure mode according to an embodiment of the present disclosure.

Next, refer to FIG. 1 to FIG. 4 and FIG. 6 simultaneously, and FIG. 6 is a flowchart of a BIOS recovery and backup method when operating in a high-secure mode according to an embodiment of the present disclosure. Step S43 comprises steps S431-S438. After verifying the security profile successfully and interpreting the used operation mode to be the high-secure mode, in step S431, the controller 1 uses the other one security key 112 to verify the main BIOS and BIOS 212. If the verification of the main BIOS is successful (i.e. the main BIOS is valid), step S432 is executed; otherwise, step S436 is executed. In step S432, the controller 1 further inspects or checks the version of the main BIOS to discriminate whether the main BIOS has been stored in the storage device 2. For instance, comparing the version of the main BIOS and the version of the BIOS 212. If the BIOS 212 of the storage device has had the main BIOS, step S435 will be executed; otherwise, step S433 will be executed.

If there is no main BIOS in the BIOS 212 stored in the storage device 2, in step S433, the event that there is no main BIOS in the BIOS 212 stored in the storage device 2 will be recorded to the system debug log 211 in the storage device 2. Then, in step S434, the main BIOS is backed up and stored to the storage device 2. Next, in step S435, the controller 1 further inspects or checks whether the version of the main BIOS is the latest. If the version of the main BIOS is the latest, the booting of the computing device 3 will be finished; otherwise, step S436 will be executed.

If the main BIOS is invalid and not verified successfully, or the version of the main BIOS is not the latest, in step S436, the controller 1 will firstly record the event that the main BIOS is invalid or not the latest version to the system debug log 211 stored in the storage device 2. Then, in step S437, the latest version of the BIOS 212 will be used for the recovery of the main BIOS. Next, in step S438, the computing device 3 is allowed to reboot. It is noted that, through the above design method, it can be ensured that the version of the main BIOS is the latest, and comparing to the past version, the latest version of the main BIOS usually may revise more bugs, so that the high-secure mode can allow the computing device 3 to obtain the highest security so far. Furthermore, step S433 and step S436 are not necessary steps in other embodiments.

Figure 7:
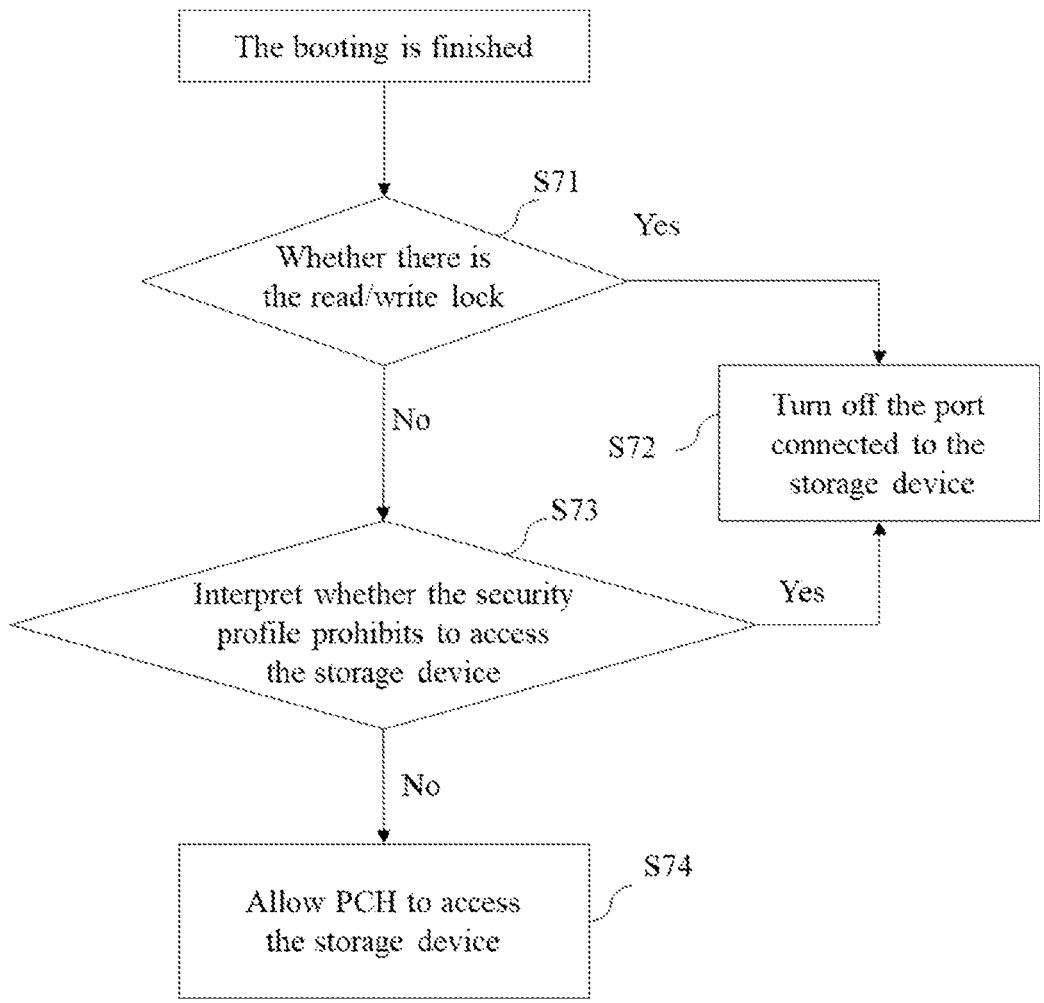
FIG. 7 is a flowchart of a BIOS recovery and backup method after a booting process has been done according to an embodiment of the present disclosure.

At the last, refer to FIG. 1 to FIG. 3 and FIG. 7 simultaneously, and FIG. 7 is a flowchart of a BIOS recovery and backup method after a booting process has been done according to an embodiment of the present disclosure. After booting, according to whether there are the operation mode and the read/write lock, whether the platform control hub 33 is allowed to access the storage device 2 or the port connected to the storage device 2 is turned off (via stopping supplying power to the port, but the present disclosure is not limited) is determined. First, in step S71, the controller 1 discriminates whether there is the read/write lock stored in the storage device 2. If there is no read/write lock stored in the storage device 2, step S73 will be executed; otherwise, S72 will be executed. In step S72, because there is the read/write lock stored in the storage device 2, the controller 1 will turn off the port connected to the storage device 2. In step S73, while discriminating which operation mode is in use during the booting, if the operation mode is the secure mode, step S72 will be executed; otherwise, step S74 will be executed. If the operation mode is the non-secure mode and there is no read/write lock stored in the storage device 2, the controller 1 will further control the switcher 34 to allow the platform control hub 33 to access the storage device 2, and thus the user can access the storage device 2 via the computing device 3.

In summary, the technical manner provided in embodiments of the present disclosure can achieve the technical effects below:

(1) The technical manner of the present disclosure is suitable to the computing device with the single BIOS of the single non-volatile memory, so as to reduce the cost of the non-volatile memory.

(2) The operation mode of the security profile can be chosen by the user, so as to provide flexibility to the user.

(3) If the main BIOS is not stored in the storage device, the main BIOS will be backed up in the secure mode, so that we can recover the computing device based on the current version of the main BIOS when the main BIOS is damaged.

(4) Whether the storage device is used as a necessary key when booting can be set, so as to increase the security.

(5) Whether the storage device is allowed to be accessed by users after operating the booting in the non-secure mode can be set.

(6) If the main BIOS is damaged, the BIOS stored in the storage device can be used to recover the main BIOS via the secure mode All examples and embodiments in the present disclosure are only used to state the purpose. The modifications or changes based on the present disclosure will be suggested to those skilled in the art, and are be included in the essence, the scope, and the scope of the appended claims in the present disclosure.

What is claimed is:

1. A controller used in a computing device, configured to control a switcher to allow a platform controller hub to access a storage device via the switcher, comprising:
   a storage unit, configured to store a firmware, a first security key and a piece of security profile configuration;
   an input/output interface, electrically connected to the switcher; and
   a processing unit, configured to read the firmware when the computing device boots, so as to execute at least steps as follows:
   using the first security key to verify a security profile stored in the storage device when the storage device connects to an input/output interface;
   using an operation mode profiled by the security profile according to the security profile configuration when successfully verifying the security profile stored in the storage device;
   completing booting of the computing device when the operation mode is a non-secure mode;
   using at least one basic input/output system (BIOS) stored in the storage device to recover a main BIOS and rebooting the computing device when the operation mode is a high-secure mode or a multiple-backup mode and the main BIOS in the computing device is invalid; and
   backing up and storing the main BIOS to the storage device when the operation mode is the high-secure mode or the multiple-backup mode and the main BIOS is valid but does not store in the storage device.

2. The controller of claim 1, wherein the storage unit further stores a second security key, the second security key is used to verify the main BIOS and the BIOS stored in the storage device, and only the BIOS successfully verified can be used to recover the main BIOS.

3. The controller of claim 1, wherein the operation mode is the high-secure mode, executing steps comprise:
   the processing unit controls the storage device to store the main BIOS and completes the booting of the computing device when the main BIOS is a latest version in comparison of the version of the BIOS stored on the storage device and the main BIOS is not stored in the storage device;
   using the latest version of the BIOS to recover the main BIOS and rebooting the computing device when the main BIOS is not the latest version in comparison of the version of the BIOS stored on the storage device and the storage device stores the latest version of the BIOS; and
   completing the booting of the computing device when the main BIOS is the latest version in comparison of the version of the BIOS stored in the storage device and the storage device stores the latest version of the BIOS.

4. The controller of claim 1, wherein the operation mode is the multiple-backup mode, executing steps comprise:
   using selected BIOS in the storage device to recover the main BIOS and rebooting the computing device when the main BIOS is invalid.

5. The controller of claim 1, wherein the processing unit is further used to control the storage device to store a system debug log to the storage device, wherein the system debug log comprises at least one event.

6. The controller of claim 1, wherein the processing unit determines whether the storage device stores an access lock, when the storage device stores the access lock, stop providing power to the storage device, and when the storage device does not store the access lock, determine whether to stop providing the power to the storage device or to control the switcher to be able to access the storage device according to the operation mode profiled by the security profile.

7. The controller of claim 1, wherein the controller is an embedded controller set on a motherboard of the computing device or an embedded input/output controller set on the motherboard.

8. A computing device, comprising:
   the controller of claim 1;
   a central processing unit (CPU);
   the switcher;
   a platform controller hub; and
   a non-volatile memory (NVM) for storing the main BIOS.

9. A bios recovery and backup method executed in a controller of a computing device, wherein the bios recovery and backup method is executed when the computing device boots, and the bios recovery and backup method comprising:
   using a first security key to verify a security profile stored in a storage device;
   determining an operation mode profiled by the security profile according to a security profile configuration stored in the controller when successfully verifying the security profile;
   completing booting of the computing device when the operation mode is a non-secure mode;
   using at least one basic input/output system (BIOS) stored in the storage device to recover a main BIOS and rebooting the computing device when the operation mode is a secure mode and the main BIOS in the computing device is invalid; and
   backing up the main BIOS and storing in the storage device when the operation mode is a secure mode but the storage device does not store the main BIOS.

10. The bios recovery and backup method of claim 9, wherein when the operation mode is the secure mode, a switcher is controlled to forbid the platform controller hub to access the storage device by the switcher; when the operation is non-secure mode, the switcher is controlled to allow the platform controller hub to access the storage device by the switcher.

11. The bios recovery and backup method of claim 9, wherein when the security profile stored in the storage device is unsuccessfully verified, the controller is operated in the non-secure mode, and the controller further determines whether the controller stores a key lock security profile or not; wherein the controller interrupts the booting of the computing device when the controller stores the lock security profile, or the controller completes the booting of the computing device when the controller does not store the lock security profile.

12. The bios recovery and backup method of claim 9, wherein the secure mode is a high-secure mode and the steps executed in the high-secure mode comprise:
   controlling the storage device to store the main BIOS and completing the booting of the computing device when the main BIOS is a latest version and does not be stored in the storage device in comparison of the version of the BIOS stored in the storage device;
   using the BIOS of the latest version to recover the main BIOS and rebooting the computing device when the main BIOS is not the latest version and the storage device stores the BIOS of the latest version in comparison of the version of the BIOS stored in the storage device; and completing the booting of the computing device when the main BIOS is the latest version and the storage device stores the BIOS of the latest version in comparison of the version of the BIOS stored in the storage device.

13. The bios recovery and backup method of claim 9, wherein the secure mode is a multiple-backup mode and the steps executed in the multiple-backup mode comprise:

using selected BIOS in the storage device to recover the main BIOS and rebooting the computing device when the main BIOS is invalid.

14. The bios recovery and backup method of claim 9, wherein whether the storage device stores an access lock or not is determined after completing the booting of the computing device, power is stopped being provided to the storage device when the storage device stores the access lock, or when the storage device does not store an access lock, according to the operation mode of the security profile, the power is determined to be stopped being provided to the storage device or a switcher is controlled to allow the storage device to be accessed by a platform controller hub.

15. The bios recovery and backup method of claim 9, further comprising:

generating a security profile based on a first key and a user command, and writing the security profile to a storage device, wherein the security profile is defined as to designate a controller of the computing device to operate in a non-secure mode or a secure mode after the secure profile is verified;

determining whether to generate a key lock security profile and write the key lock security profile to a storage unit of the controller in the computing device or not according to the user command, wherein the key lock security profile is used to interrupt the booting of the computing device when the security profile does not be successfully verified; and generating an access lock and writing the access lock to the storage device according to the user command, wherein the access lock is used to indicate the controller to stop providing power to the storage device after completing the booting of the computing device.

16. The bios recovery and backup method of claim 15, wherein the security profile is set by:

providing a user to browse a system debug log stored in the storage device according to the user command; and storing at least one BIOS to the storage device according to the command of a user.

* * * * *